(12) United States Patent
Bousmina et al.

(10) Patent No.: US 6,649,103 B1
(45) Date of Patent: Nov. 18, 2003

(54) PROCESS FOR MAKING MULTIPHASE POLYMERIC FILM HAVING A LAMELLAR STRUCTURE WITH CONTROLLED PERMEABILITY AND/OR CONTROLLED MECHANICAL PROPERTIES

(75) Inventors: Mosto Bousmina, Sainte-Foy (CA); Abdellatif Ait-Kadi, Quebec (CA)

(73) Assignee: Université Laval, Quebec (CA)

( * ) Notice: Subject to any disclaimer, the term of this patent is extended or adjusted under 35 U.S.C. 154(b) by 0 days.

(21) Appl. No.: 09/560,188

(22) Filed: Apr. 28, 2000

(30) Foreign Application Priority Data

Apr. 30, 1999 (CA) .............................................. 2270515

(51) Int. Cl.$^7$ .............................................. B29C 47/00
(52) U.S. Cl. ................. 264/171.1; 264/211; 264/210.1; 264/288.4
(58) Field of Search ........................ 264/210.1, 171.1, 264/173.14, 173.19, 174.1, 288.4, 211

(56) References Cited

U.S. PATENT DOCUMENTS

| | | | |
|---|---|---|---|
| 4,347,332 A | 8/1982 | Odorzynski et al. ........ 524/169 |
| 4,410,482 A | 10/1983 | Subramanian .............. 264/515 |
| 4,600,746 A | 7/1986 | Schmukler et al. ........... 525/57 |
| 4,828,915 A | 5/1989 | Schroeder et al. .......... 428/332 |
| 4,950,513 A | 8/1990 | Mehra ........................ 428/36.7 |
| 4,971,864 A | * 11/1990 | McCord ..................... 428/516 |
| 5,085,816 A | * 2/1992 | McCord ..................... 264/171 |
| 5,153,262 A | * 10/1992 | Beers .......................... 525/57 |
| 5,188,784 A | * 2/1993 | Kamal et al. ............... 264/108 |
| 5,330,696 A | 7/1994 | Mehra ........................ 264/141 |
| 5,369,168 A | 11/1994 | Famili et al. ................. 525/57 |
| 5,399,619 A | 3/1995 | Torradas et al. ............. 525/57 |
| 5,534,351 A | * 7/1996 | Pearson et al. ............. 428/516 |
| 5,641,833 A | 6/1997 | Jung et al. .................... 525/57 |
| 5,712,043 A | * 1/1998 | Chen et al. ................. 428/500 |
| 6,011,115 A | * 1/2000 | Miharu et al. ................ 525/57 |
| 6,294,602 B1 | * 9/2001 | Shimo et al. ............... 524/394 |

OTHER PUBLICATIONS

Faisant J.B. et al. "Morphology, thermomechanical and barrier properties of polypropylene–ethylene vinyl alcohol blends", Polymer vol. 39 No. 3, 1998.

* cited by examiner

*Primary Examiner*—Mark Eashoo
(74) *Attorney, Agent, or Firm*—Foley & Lardner

(57) ABSTRACT

A process for making a multiphase polymeric film having a lamellar structure with controlled permeability and/or controlled mechanical properties, comprising the steps of:

preparing a molten blend made of a first polymer phase dispersed in a second polymer phase which is a matrix polymer phase incompatible with the said first phase and of a compatibilizer selected from the group consisting of DEM, MAH, DEM-g-SEBS, MAH-g-SEBS, DEM-g-PP and MAH-g-PP;

extruding the molten blend through a flat die provided with an exit and stretching the so extruded blend downwards said exit at a preselected stretching ratio to produce the said multiphase polymeric film, and solidifying the extruded film sufficiently rapidly to preserve the lamellar structure and the multiphase polymeric films thereby obtained.

Granules with a lamellar structure are obtained by grinding the so obtained multiphase polymeric film and are useful for preparing shaped articles with improved physical properties.

38 Claims, 15 Drawing Sheets

PROCESS FOR MAKING MULTIPHASE POLYMERIC FILM HAVING A LAMELLAR STRUCTURE WITH CONTROLLED PERMEABILITY AND/OR CONTROLLED MECHANICAL PROPERTIES

1. Field of the Invention

The present invention relates to a process for making polymeric films, material packaging and shaped articles like gasoline tanks, that meet specific technical requirements such as barrier and mechanical properties while being easy and cheap to manufacture by extrusion.

2. Brief Description of the Prior Art

Traditionally, polymer films or shaped materials are of a multilayer structure and are produced by coextrusion of a polyolefin and of a condensation polymer incompatible with the polyolefin.

The multilayer structure of the coextruded product is achieved by combining different layers in a die before their extrusion as a preform. The obtained preform is then blown and molded in the form of the final product.

Polymer blending by extrusion followed by stretching at the exit of the die was found to impart the obtained films with enhanced barrier properties. Drawing orients the matrix microstructure and the particles of the dispersed phase in the direction of drawing.

Kamal et al. in U.S. Pat. No. 5,188,784 (1993) disclose a special sophisticated die system allowing to achieved such a post extrusion orientation.

Faisant and al. in Polymer, Volume 39, No. 3, 1998 disclose the extrusion of blends of ethylene vinyl alcohol copolymer (EVOH) dispersed in either polypropylene or in polyethylene. The so obtained film is then stretched through a flat die. Such a drawing is disclosed as inducing a mixture of lamellae and fibrils of EVOH in polyolefin matrix. The polyolefin/EVOH blends thereby prepared are compatibilized using commercial maleic anhydride functionalized polyolefins. This approach is found to lead to materials with 85% decrease in the permeability to oxygen in comparison with that of pure polyolefin.

Polymer blends used in such processes include two or more polymers that are mixed physically. Compatible blends yield polymer alloys, whereas most of the commercial blends comprise incompatible polymers to form a dispersion of one polymer in the other one. The behavior of polymer blend product depends to a large extent, on the microstructure of the blend reflecting the size and distribution of the dispersed phase, and the nature of the interface between the two phases.

P. Subramanian in U.S. Pat. No. 4,410,482 (1983) discloses a method for producing a lamellar structure from a polymer blend. In a first step, an heterogeneous blend of polyolefin, a condensation polymer incompatible with the polyolefin and a compatibilizer consisting of an alkylcarboxyl-substituted polyolefin, is prepared. The heterogeneous blend is heated above the highest melting point of the blend constituents. The body of the molten blend obtained by extrusion is elongated by means of a conventional equipment.

The polyolefin forms a continuous matrix phase while the condensation polymer incompatible with the polyolefin presents the form of a discontinuous distribution of the thin, substantially two-dimensional, parallel and over-lapping layers. The compatibilizer, namely the alkylcarboxyl-substituted polyolefin, is present between the matrix phase and the layers of condensation polymer to adhere these matrix and layer together.

To carry out such multilayer extrusion process, the required equipment is complex and expensive, and at least one adhesive tie-layer is necessary.

The numerous works published on the matter stress the difficulty to design a low-cost material for use as packaging or for the manufacture of gasoline tanks, that have barrier and mechanical properties sufficient to make them efficient.

Such a material must be easy to process at low cost and due to recent environmental laws, it has to be recyclable. Optical clarity, in the case of films for food packaging, is also often required.

Plastic containers with high barrier properties are usually made of a multi-layers material produced by coextrusion. This is a complex and expensive technology and the final product is not recyclable. Therefore, polymer blending appears to be a more beneficial alternative in designing materials having enhanced physical properties with the possibility of recycling the final product. The addition of a small quantity of a barrier material into a low-cost matrix material can lead to a low-cost product with greatly improved barrier properties. Polypropylene (PP) is a suitable polymer with good mechanical and good barrier properties to $H_2O$. On the other hand, EVOH which, as aforesaid, is a copolymer of ethylene and vinyl alcohol, has high barrier properties to gases such as $O_2$ and $CO_2$ and a high resistance to hydrocarbons. This makes EVOH an interesting candidate for food applications. However, EVOH is an expensive material.

There is therefore a need for a process allowing the preparation of films with a reduced amount of EVOH.

OBJECTS AND SUMMARY OF THE INVENTION

A first object of the invention is to provide a process for making a multiphase polymeric film having a lamellar structure with controlled permeability and/or controlled mechanical properties.

A second object of the invention is to provide the multiphase polymeric film with a lamellar structure obtained by the said process for making a multiphase polymeric film having a lamellar structure with controlled permeability and/or controlled mechanical properties.

A third object of the invention is to provide granules having a lamellar structure, which are obtained by grinding the multiphase polymeric film with lamellar structure obtained by the said process for making a multiphase polymeric film having a lamellar structure with controlled permeability and/or controlled mechanical properties.

A fourth object of the invention is to provide a process for producing a shaped article of polymeric material by using the granules obtained by grinding the multiphase polymeric film according to the invention.

A fifth object of the present invention is to provide a shaped article with improved permeability to oxygen and improved mechanical properties.

The process according to the invention for making the multiphase polymeric film as broadly disclosed hereinafter comprises a step of:

preparing a molten blend made of
  a first polymer phase dispersed in a second polymer phase which is a matrix polymer phase incompatible with the said first phase and
  a compatibilizer selected from the group consisting of DEM, MAH, DEM-g-SEBS, MAH-g-SEBS, DEM-g-PP and MAH-g-PP;

extruding the molten blend through a flat die provided with an exit stretching the so-extruded blend downwards said exit at a preselected stretching ratio to produce the said multiphase polymeric film, and solidifying the extruded film sufficiently rapidly to preserve the lamellar structure.

The invention as claimed is however restricted to the used of DEM, DEM-g-SEBS and DEM-g-DP as compatibilizers.

Granules with a lamellar structure according to the invention, are obtained by grinding the so obtained multiphase polymeric film.

These granules can be used for producing shaped articles of polymeric material.

The objects, advantages and other features of the present invention will become more apparent upon reading of the following non restrictive description of a preferred embodiment thereof, given by way of example only with reference to the accompanying drawings.

BRIEF DESCRIPTION OF THE DRAWINGS

FIG. 6-*b* is a cross-section view of a filament of PP/EVOH/PP-g-MAH cryogenically broken transversely to the drawing direction (Draw ratio=20).

FIG. 6-*c* is a cross-section view of a filament of PP/EVOH/PP-g-DEM cryogenically broken transversely to the drawing direction (Draw ratio=20).

FIG. 6-*d* is a cross-section view of a filament of PP/EVOH/SEBS-g-MAH cryogenically broken transversely to the drawing direction (Draw ratio=20).

FIG. 6-*e* is a cross-section view of a filament of PP/EVOH/SEBS-g-DEM cryogenically broken transversely to the drawing direction (Draw ratio=20).

FIG. 7-*b* is a cross-section view of a stretched film of PP/EVOH/PP-g-MAH cryogenically broken along the drawing direction (Draw ratio=10).

FIG. 7-*c* is a cross-section view of a stretched film of PP/EVOH/PP-g-DEM cryogenically broken along the drawing direction (Draw ratio=10).

FIG. 7-*d* is a cross-section view of a stretched film of PP/EVOH/SEBS-g-MAH cryogenically broken along the drawing direction (Draw ratio=10).

FIG. 7-*e* is a cross-section view of a stretched film of PP/EVOH/SEBS-g-DEM cryogenically broken along the drawing direction (Draw ratio=10).

DETAILED DESCRIPTION OF THE INVENTION

Figure 1:
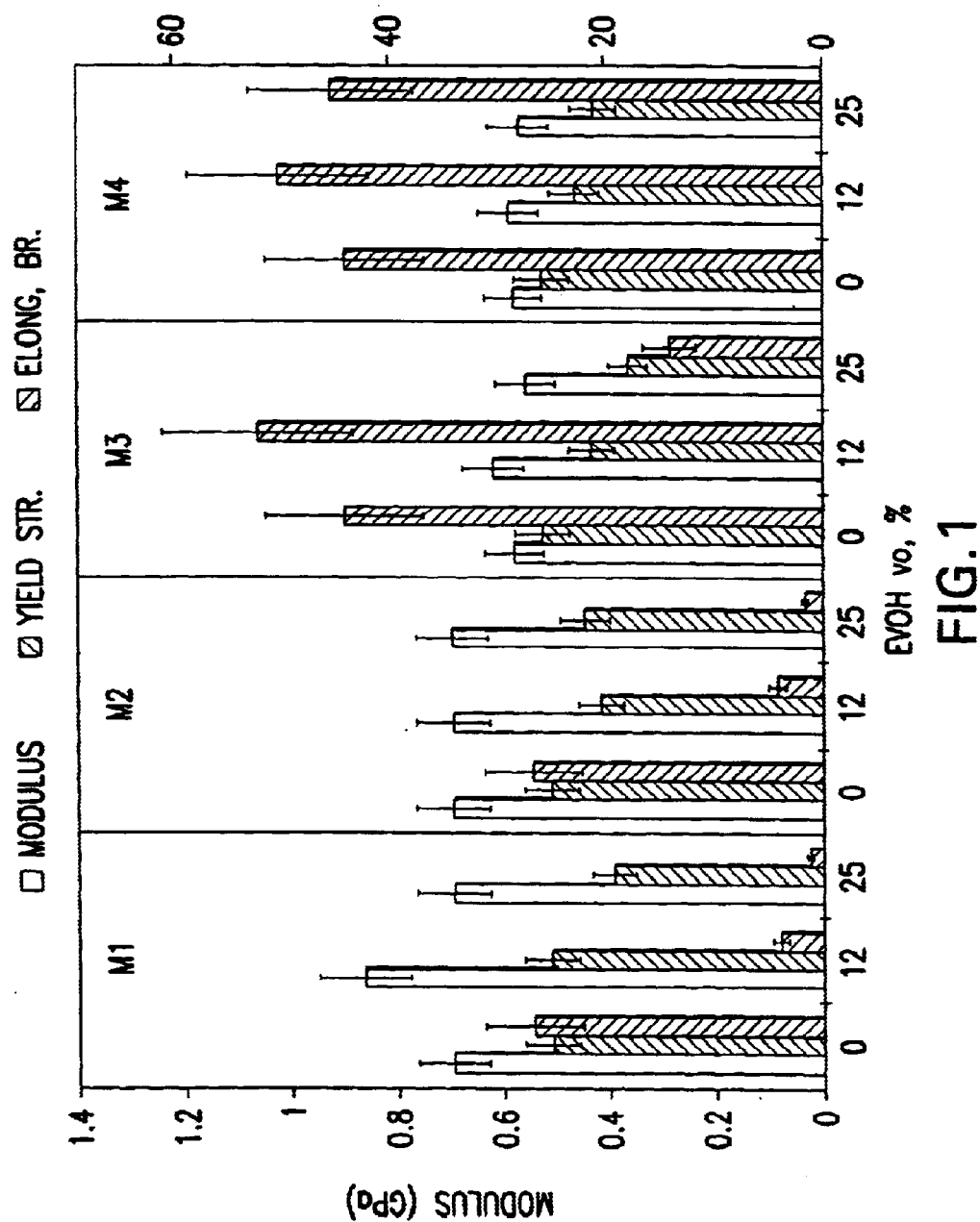
FIG. 1 illustrates the modulus, yield stress and elongation at break versus the EVOH concentration for PP/EVOH systems blended in batch mixer: (M1) PPhv/EVOH, 200° C., 38 rpm; (M2) PPhv/EVOH, 230° C., 38 rpm; (M3) PPlv/EVOH, 200° C., 30 rpm; (M4) PPlv/EVOH, 200° C., 60 rpm.

As aforesaid, the process according to the invention for making a multiphase polymeric film having a lamellar structure with controlled permeability and/or controlled mechanical properties, comprises four basic steps.

The first one consists of preparing a molten blend that is made of:
  a first polymer phase dispersed in a second polymer phase which is a matrix polymer phase incompatible with the said first phase and
  a compatibilizer selected from the group consisting of DEM, MAH, DEM-g-SEBS, MAH-g-SEBS, DEM-g-PP and MAH-g-PP.

The second step consists of extruding the molten blend through a flat die provided with an exit.

The third step consists of stretching the so extruded blend downwards the exit at a preselected stretching ratio to produce the multiphase polymeric film.

The fourth and last step consists of solidifying the extruded film sufficiently rapidly to preserve the lamellar structure.

According to a particularly preferred embodiment of the invention, the first polymeric phase consists of a barrier polymer. This barrier polymer is preferably selected from the group consisting of ethylene vinyl alcohol copolymers (EVOH), polyamides (PA), polyethylene terephthalates (PET) and poludivinylchloride (PVDC).

More preferably, the barrier polymer is EVOH. Such EVOH polymer preferably has a molecular weight in the range of 20,000 to 100,000.

According to another particularly preferred embodiment of the invention, the matrix polymer phase is a thermoplastic matrix polymer phase which preferably consists of a polyolefin such as polyethylene (PE) or polypropylene (PP).

According to a particularly preferred embodiment of the invention, the molten blend comprises:
  60 to 90 weight percent of the polyolefin polymer phase,
  less than 30 weight percent of the barrier polymer, and
  0.2 to 10 weight percent of the compatibilizer.

More preferably, the molten blend comprises from 1 to 3 weight percent of the compatibilizer.

According to a further particularly preferred of the invention, the compatibilizer is selected amongst DEM-g-SEBS, MAH-g-SEBS, DEM-g-PP and MAH-g-PP.

The multiphase polymeric film which is obtained by the above-defined process has a lamellar structure. By grinding this multiphase polymeric film, one may obtain granules having a lamellar structure.

These granules can be used to produce shaped articles of polymeric material, which have improved mechanical and barrier properties. These articles may be produced by direct injection or by extrusion of a blend of granules obtained by the process according to the invention.

Shaped articles of polymeric material can also be obtained by reprocessing granules according to the present invention at a temperature that is lower than the melting temperature of the barrier polymer but higher than the melting temperature of the matrix polymer phase.

According to a preferred embodiment of the invention, the granules with a lamellar structure can be reprocessed by injection moulding, thermoforming or extrusion.

When the barrier polymer is EVOH and the matrix polymer phase is PP, the reprocessing temperature is preferably in the range from 160 to 175° C. More preferably, this temperature is about 170° C.

When the barrier polymer is PA and the matrix polymer phase is PP or PE, the reprocessing temperature is preferably in the range from 180 to 215° C.

The shaped articles obtained by the process according to the invention are characterized in that they have, in comparison with similar shaped articles obtained according to the same process but without compatibilizer present in the blend:
- a permeability to oxygen which is improved to about 100%, as compared to a similar article made of PP, measured under 30 to 90% of relative humidity with an apparatus Oxtron* 2/60 from MOCON; and
- mechanical properties (modulus and elongation at break) which are improved to about 30 to 120%, according to ASTM D 882-28.

Experimental Data

In the tests reported hereinafter, a blow-molding grade polypropylene (PP) (Profax-613D*) from Himont Canada, Inc. was used as thermoplastic matrix phase.

EVOH was used as first polymeric phase. The EVOH that was so used was a product sold by EVAL-CO, which contains 32 moles percent of ethylene monomer, and it is approved for food packaging applications.

As compatibilizers, use was made of the following two commercial copolymers obtained from Shell Canada.

1) a copolymer of styrene-ethylene-butene-styrene (SEBS) functionalized with maleic anhydride (MAH) (Kraton* FG-1901, 2 wt. % functionalization)—hereafter called SEBS-g-MAH—; and
2) the same copolymer SEBS functionalized with diethyl maleate (DEM) (Kraton* G-1652, 1.1 wt. % functionalization)—hereinafter called SEBS-g-DEM—.

*(Trademarks)

The SEBS-g-MAH was used as such. However, the SEBS-g-DEM originally in form of powder, was extruded and then cut into granules before its incorporation into the blend.

As compatibilizers, use was also made of PP functionalized with maleic anhydride (MAH) and diethyl maleate (DEM). MAH and DEM were directly grafted onto the PP in the extruder using dicumyl peroxide (purchased from Aldrich Canada) as initiator. The obtained PP-g-MAH and PP-g-DEM were then used as compatibilizers with the above PP/EVOH blend in a second extrusion step.

During the tests, all the polymeric materials were dried for 24 hours at 80° C. prior to being melt blended in a twin-screw extruder through a flat film die (Haake Buchler Rheocord system* 40). To mix the polymers, all components (first polymer phase, matrix polymer phase and compatibilizer) were starved fed into the extruder at 30 rpm under the following temperature profile: $T_1$=160° C., $T_2$=180° C., $T_3$=190° C. and $T_4$ (Die)=200° C. The extruded film was stretched 5 cm away from the lips of the die using a controlled speed drawing machine. The same extruder was used to functionalize the polypropylene at a rate of 2 wt. % using a normal die. To do so, the polymer and peroxide initiator were premixed with MAH or DEM. Then the mixture was starved fed into the extruder. The extrudate was cut into granules and then remixed with pure PP/EVOH blend in a second step extrusion.

*(Trademark)

Characterization

Dynamic mechanical measurements were carried out on a Bohlin CVO rheometer at 200° C. in a linear viscoelastic regime. The frequency range was 0.004–30 Hz. The solid state rheological measurements were performed at 1 Hz using a Rheometric Scientific Solid Analyzer (RSA-II) equipped with a dual cantilever geometry. Temperature sweep tests were carried out between −140° C. and 160° C.

Differential Scanning Calorimetry (Perkin-Elmer, DSC-7) tests were performed between 50 and 200° C. at a heating rate of 10° C./min. The extruded films were cryogenically broken along the drawing direction and the fractured surface was coated with a 50/50 gold-platinum alloy. The morphology was observed using a JEOL, JSM-III Scanning Electron Microscope (SEM).

Tensile properties of the molded samples (dumbbells) of the original polymers and their blends were measured using a standard Instron universal-testing machine (Model 5565) according to ASTM D 882-88 procedure. The polymer sample (dumbbell) was clamped by two pneumatic grips of serrated clamps to prevent slipping of the specimens. The tensile measurements were carried at a constant cross head speed of 0.33 mm.s$^{-1}$ using a 50 kg force (490 N) load cell at room temperature. Each test was repeated at least five times and mean values and standard deviations were calculated.

The permeability of the extruded films to oxygen gas was directly measured with a Moccon apparatus Ox-Tran 2/60 at room temperature under different relative humidities.

Comparative Examples

Figure 2:
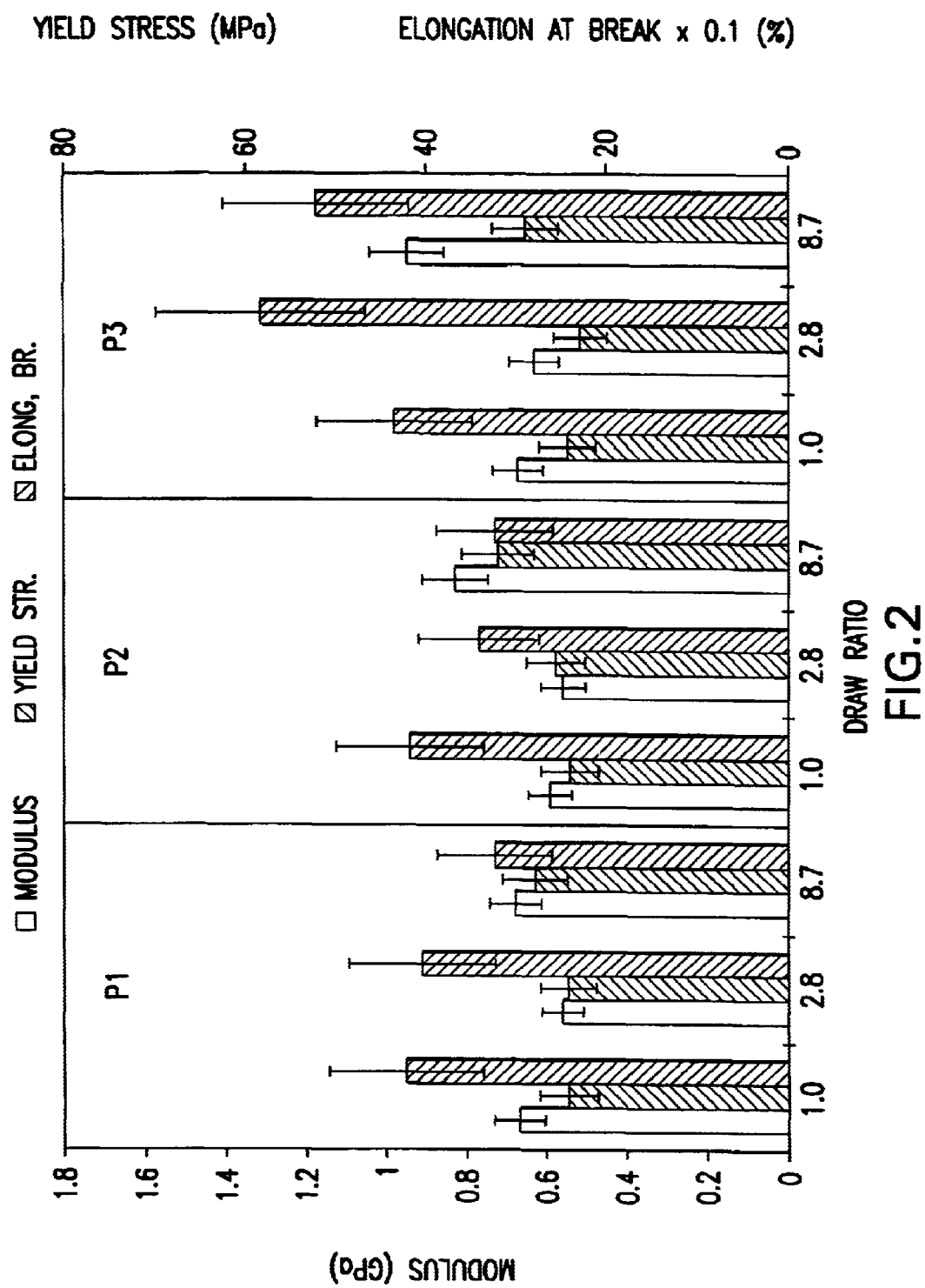
FIG. 2 illustrates the modulus, yield stress and elongation at break versus the draw ratio for extruded blends containing 10 vol. % EVOH: (P1) PPlv; (P2) PPlv/EVOH; (P3) PPlv/(PP.g.MA-EVOH).
Figure 3:
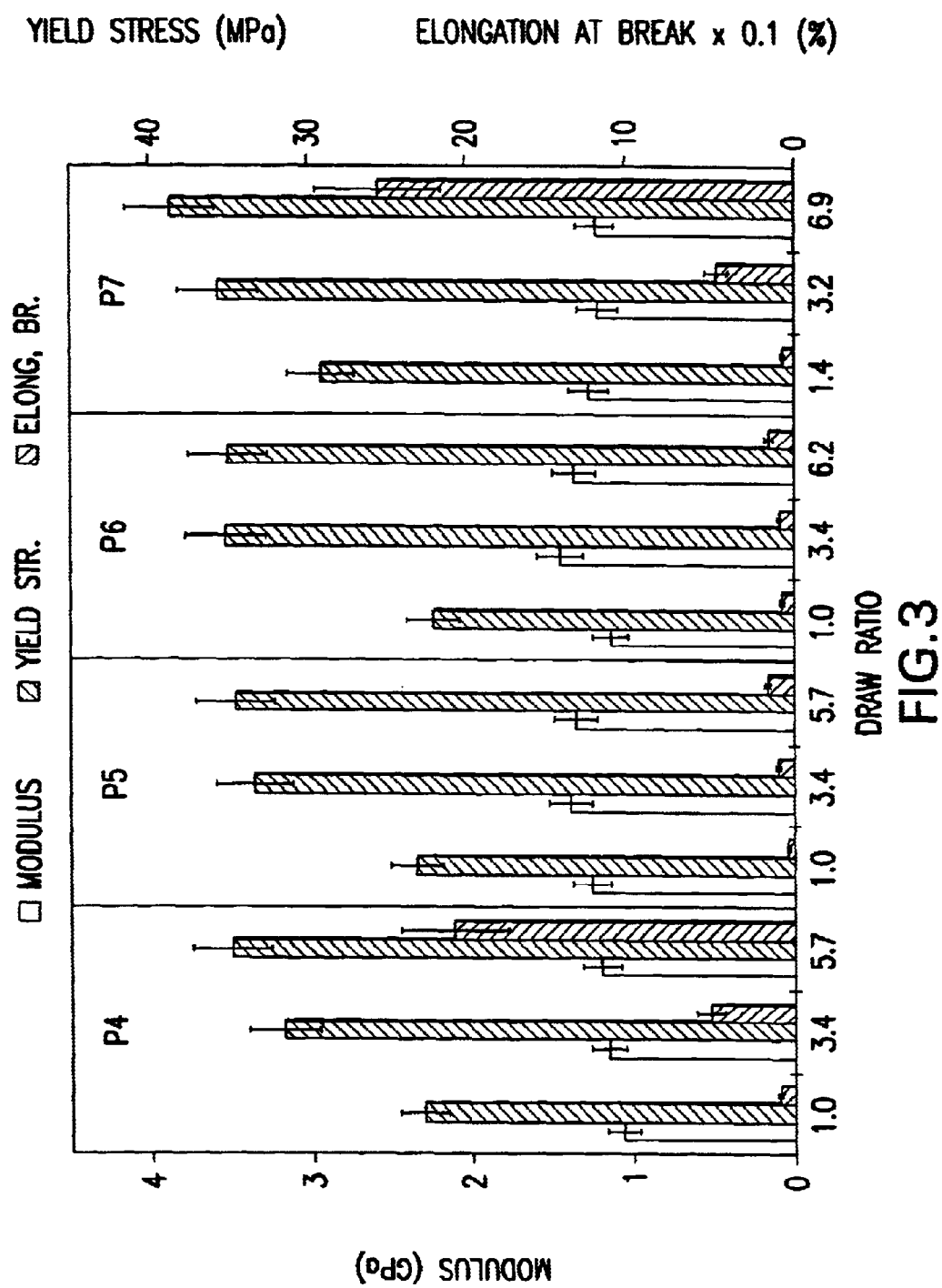
FIG. 3 illustrates the modulus, yield stress and elongation at break versus the draw ratio for extruded systems containing 20 vol. % EVOH: (P4) PPlv/(HDPE-EVOH) 60/(2020); (P5) PPlv/(HDPE-EVOH) 50/(30-20); (P6) PPlv/EVOH 80/20; (P7) PPlv/(PP.g.MA-EVOH) 60/20-20).

In a previous work (Faisant et al. Polymer, Volume 39, No. 3, 1998) improvements in the mechanical properties of PP/EVOH blends were observed when use is made of a commercial PP-g-MAH compatibilizer as additive and the blend films are drawn at the exit of extruder die. The so measured, improved mechanical properties of the blends are reported in FIGS. 1 to 3.

To clarify the effect of stretching, barrier properties of stretched films were compared with those of blends prepared in a two blades batch-mixer. These blends are characterized by a nodular morphology and by a slightly deformed nodular morphology when molded in the form of films by compression molding. The results are reported in Table 1. The measured permeabilities of the batch mixer samples are relatively high. Upon drawing, the permeability of the blends decreases (Table 2). Up to 85% improvement in barrier properties with respect to that of pure matrix (PP) was found. The improvement in barrier properties is due to the lamellar structure induced by drawing.

TABLE 1

Barrier properties of *PP/EVOH systems blended on a batch mixer

| Sample | Vol. % | T mixing (° C.) | Ω (rpm) | Measured PO$_2$ [(mm cm$^{-3}$/(m$^2$ day$^{-1}$atm$^{-1}$)] |
|---|---|---|---|---|
| PP1v | | | | 70.9 |
| PPhv | | | | 64.3 |
| EVOH | | | | 0.09 |
| PP1v/EVOH | 83.5/12.5 | 200 | 30 | 81.7 |
| | 83.5/12.5 | 200 | 60 | 58.1 |
| | 75/25 | 200 | 30 | 69.9 |

TABLE 1-continued

Barrier properties of *PP/EVOH systems blended on a batch mixer

| Sample | Vol. % | T mixing (° C.) | Ω (rpm) | Measured $PO_2$ [(mm cm$^{-3}$/(m$^2$ day$^{-1}$atm$^{-1}$)] |
|---|---|---|---|---|
| | 75/25 | 200 | 60 | 65.6 |
| | 83.5/12.5 | 200 | 200 | 59.9 |
| PPhv/EVOH | 83.5/12.5 | 200 | 200 | 75.0 |
| | 83.5/12.5 | 230 | 230 | 63.9 |
| | 75/25 | 200 | 200 | 233.0 |
| | 75/25 | 200 | 200 | 109.2 |
| | 75/25 | 230 | 230 | 73.5 |

TABLE 2

Barrier properties of PP/EVOH extruded films

| Sample | Vol.% | Draw ratio | Permeability [mm cm$^{-3}$/(m$^2$ day$^{-1}$ atm$^{-1}$] Measured |
|---|---|---|---|
| PPhv | | | 64.3 |
| PP1v | | | 70.9 |
| EVOH | | | 0.09 |
| PPhv/(PP1v-EVOH) | 80/(10-10) | 3.4 | 22.4 |
| PP1v/EVOH | 90/10 | 2.8 | 22.1 |
| | 80/20 | 3.4 | 12.4 |
| PP1v/PP.g.MA/EVOH | 80/10/10 | 2.8 | 23.1 |
| | 80/10/10 | 8.7 | 25.5 |
| PP1vV/(PP.g.MA-EVOH) | 80/(10/10) | 2.8 | 30.1 |
| | 80/(10/10) | 8.7 | 25.0 |
| | 60/(20/20) | 3.2 | 9.5 |
| PPLv/(HDPE-EVOH) | 60/(20/20) | 3.4 | 51.6 |

The conclusion of this previous work is as follows.

Non-expensive extrusion-drawing technique induces desired properties of extruded polymer films. First of all, stretching of films of polymer blends in between die and rolls gives rise to orientation of the matrix and the dispersed phase. This, in turn, improves the mechanical properties of the extruded film. Secondly, the stretched films have a special microstructure that is a mixture of fibrils and lamellae. Appearance of lamellae of the dispersed phase (EVOH, high barrier copolymer) substantially decreases the barrier properties of the stretched films.

EXAMPLES ACCORDING TO THE INVENTION

In order to demonstrate the advantage of the present invention, the same blending strategy and polymers were used except that the above mentioned new compatibilizers were used.

Then, it was found that the new compatibilizers improve the mechanical properties of the original blend due to their effectiveness as interfacial emulsifiers and to their own good mechanical properties. Replacing the strong, MAH, compatibilizer by a medium one, DEM, increases the interfacial tension while ensuring good adhesion at the interface between the matrix and the dispersed phase. Such a less efficient compatibilizer avoids the decrease of EVOH particle size, which leads to longer and wider structured lamellae and thus higher barrier performances.

Another category of materials was obtained by dispersing DEM modified blends in a matrix of low viscosity polypropylene (PPlv) at temperatures lower than the melting temperature of EVOH. This type of organic/organic composites offers the possibility of tailoring with either extrusion or injection molding a wide range of materials with adjustable properties.

RESULTS AND DISCUSSION

Rheology

Rheological measurements at 200° C. and 30 rad/s showed that the viscosity of the matrix (PP) is close to that of EVOH. Therefore, a viscosity ratio $$\left(\lambda = \frac{\eta_{dispersed\ phase}}{\eta_{matrix}}\right)$$

very close to unity is expected for these polymers at 200° C. and 30 rad/s. Close viscosity of the phases ensures better dispersion of the EVOH in the PP matrix.

Solid State Properties

Figure 4:
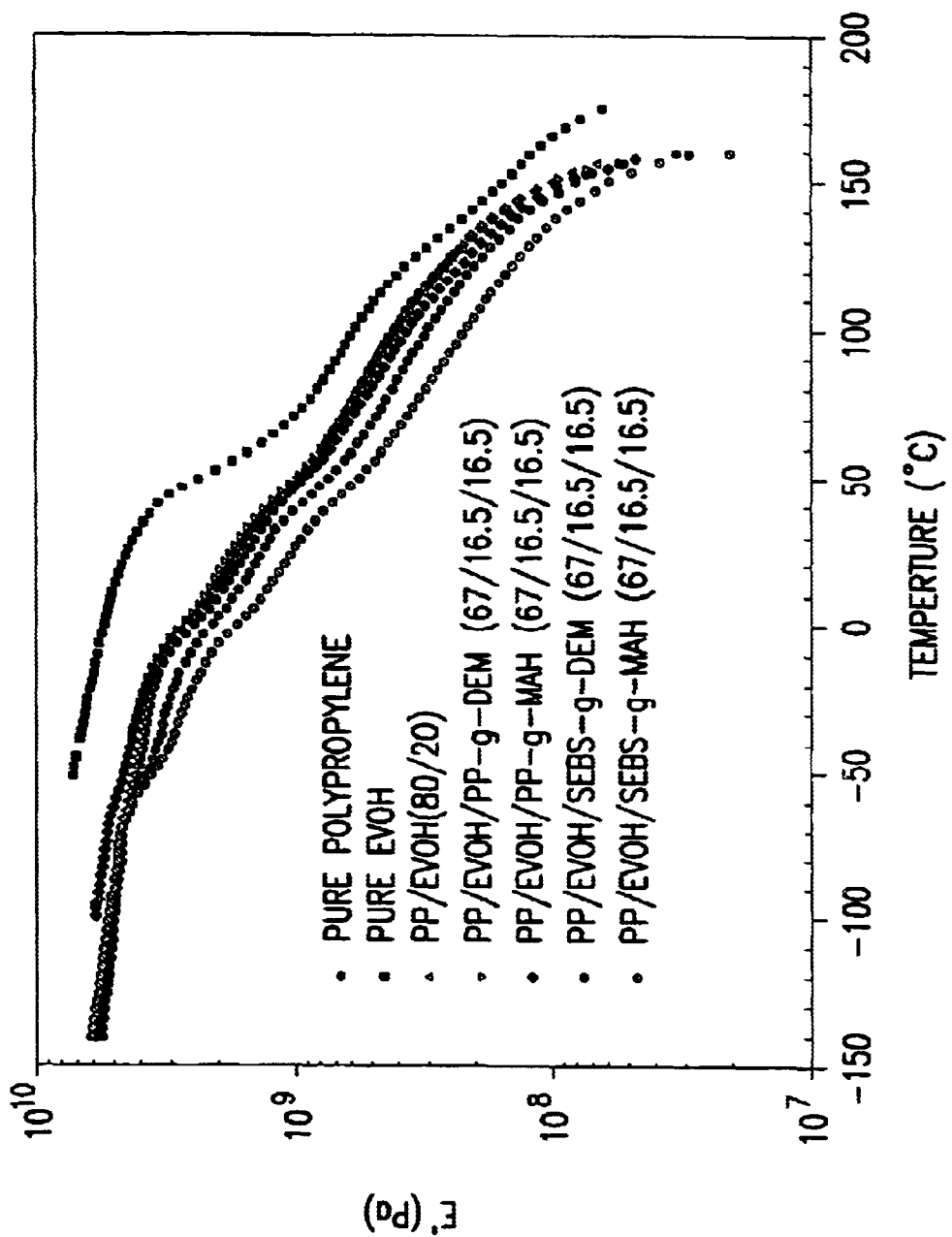
FIG. 4 illustrates the elastic modulus of the original polymers and of unmodified and modified blends made of such polymers.

Elastic modulus of the original polymers and of the unmodified and modified blends are reported in FIG. 4. As can be seen, EVOH is always more elastic than PP. The elasticity of 80/20 blend of these polymers is not very different from that of the PP matrix. On addition of DEM-g-PP and MAH g-PP, the resulting blends become more elastic at very low temperature whereas they show a slightly smaller elasticity at high temperatures. Functionalized PP do not show any significant change in the solid state properties of the blend in the temperature range that is important for food preservation (−20 to 50° C.).

Figure 5:
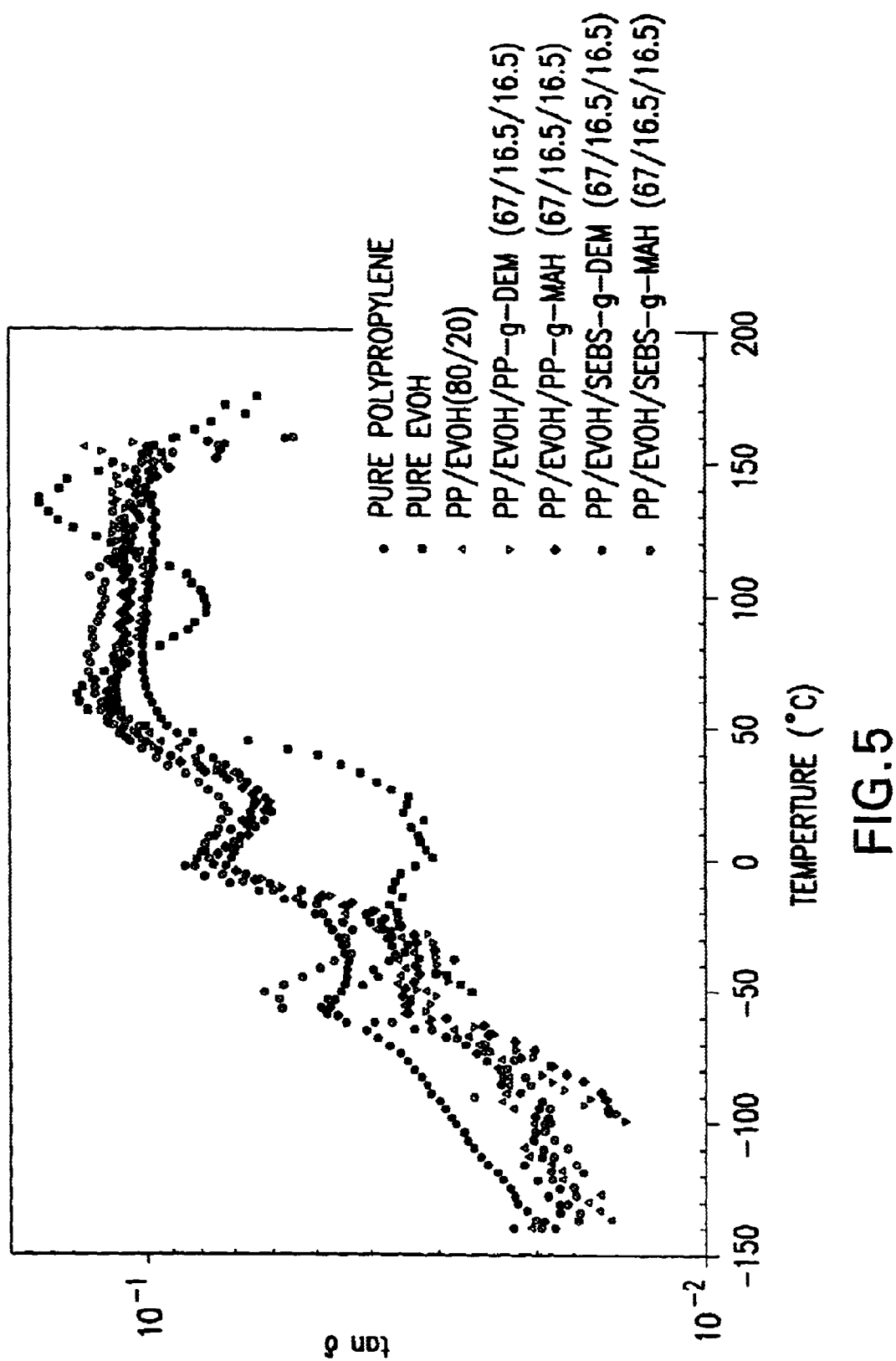
FIG. 5 illustrates the blend modulus of the original polymers and of unmodified and modified blends made of such polymers.
Figure 6A:
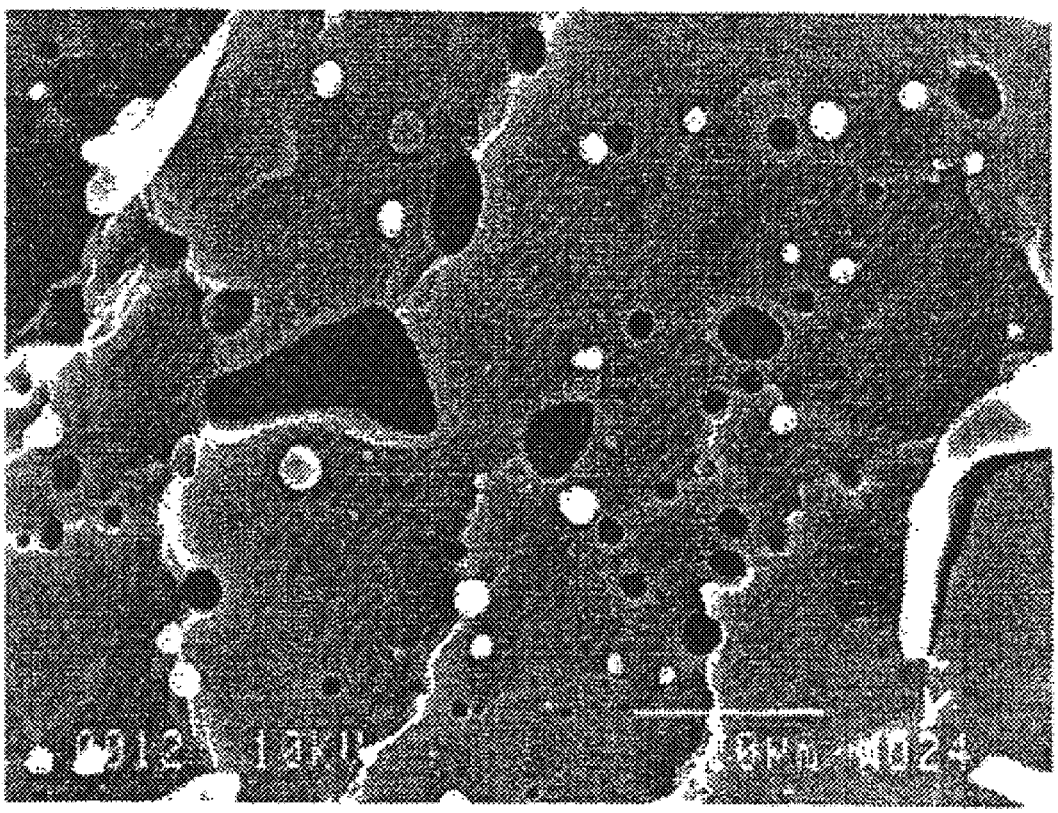
FIG. 6-*a* is a cross-section view of a filament of PP/EVOH (80/20) cryogenically broken transversely to the drawing direction (Draw ratio=20).
Figure 6B:
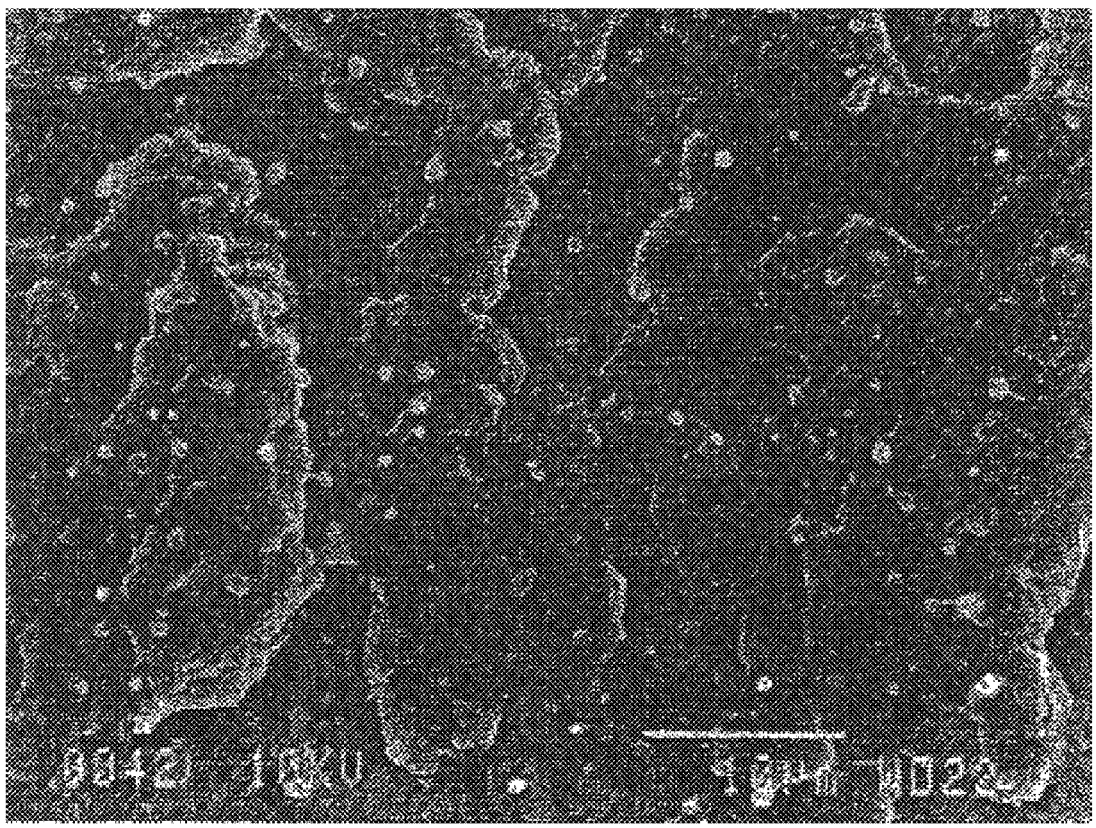
Figure 6C:
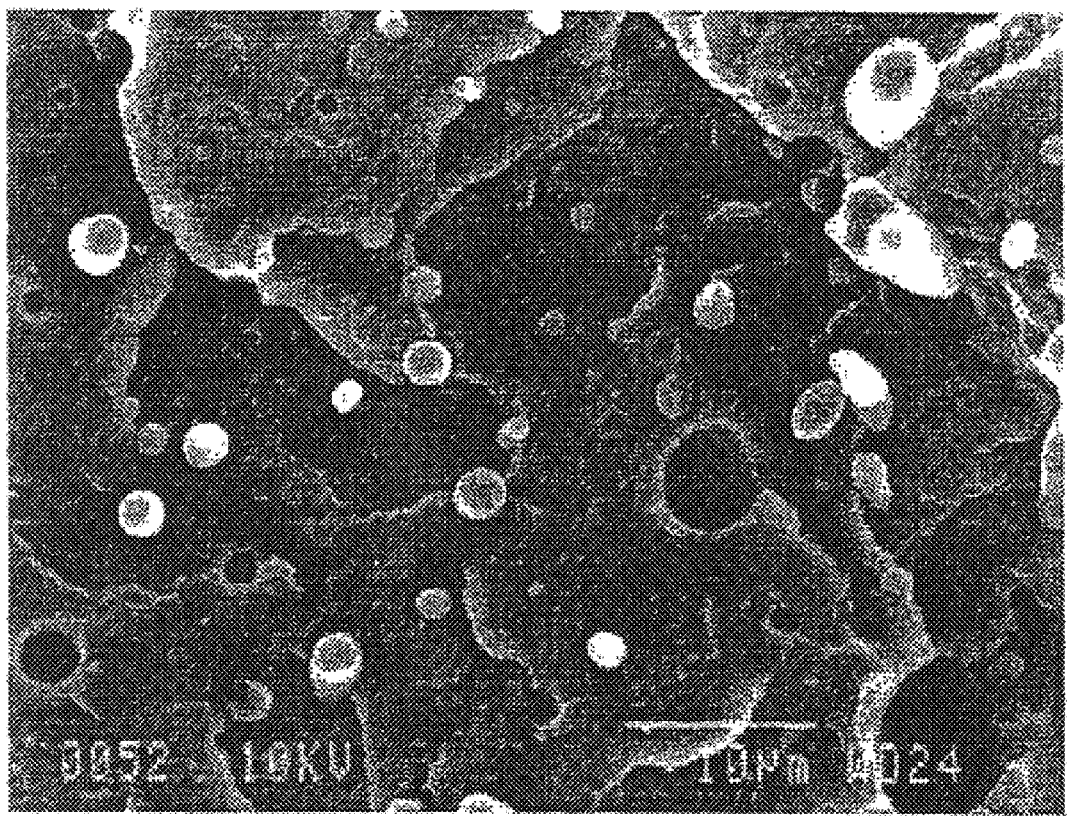
Figure 6D:
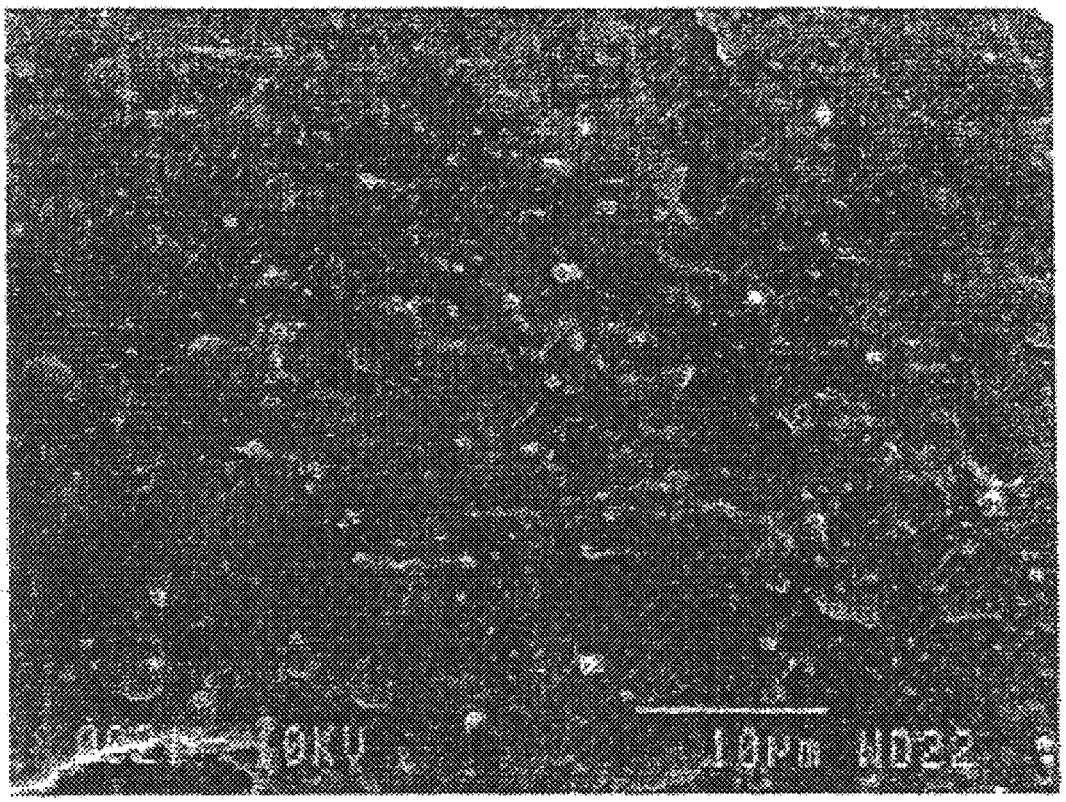
Figure 6E:
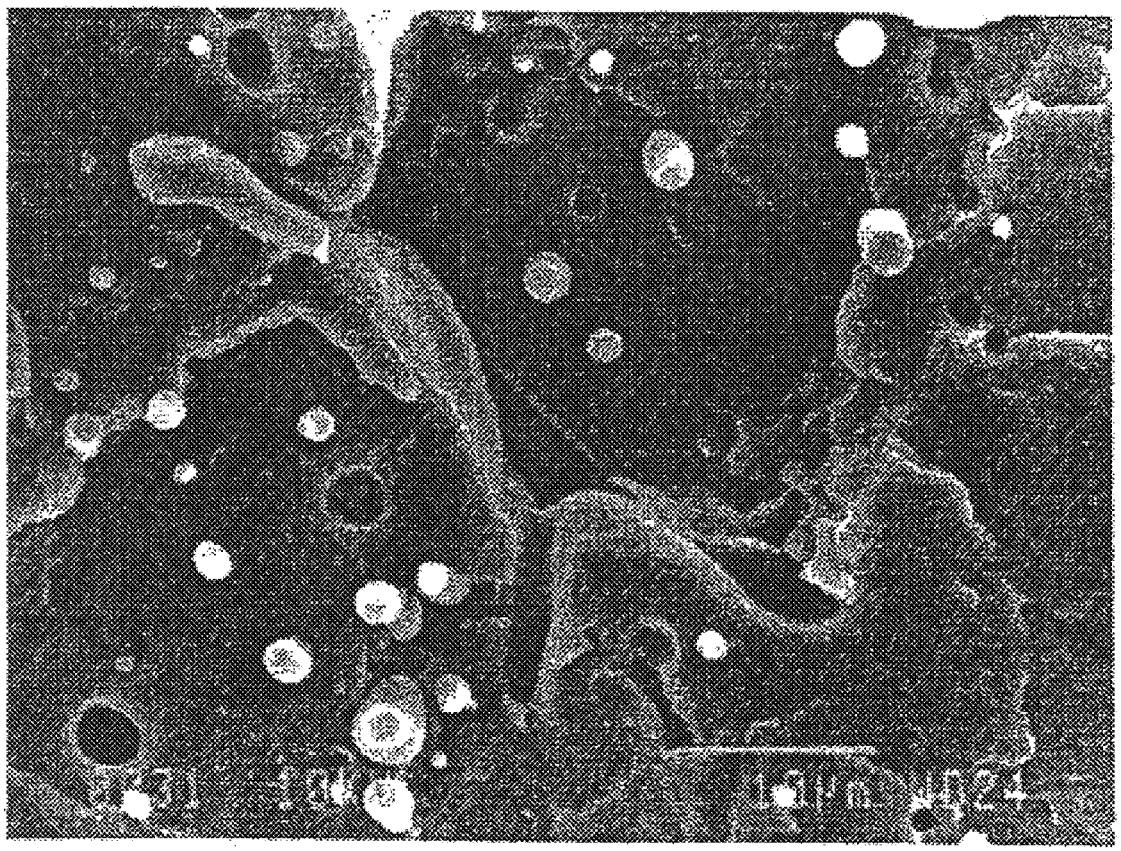
Figure 7A:
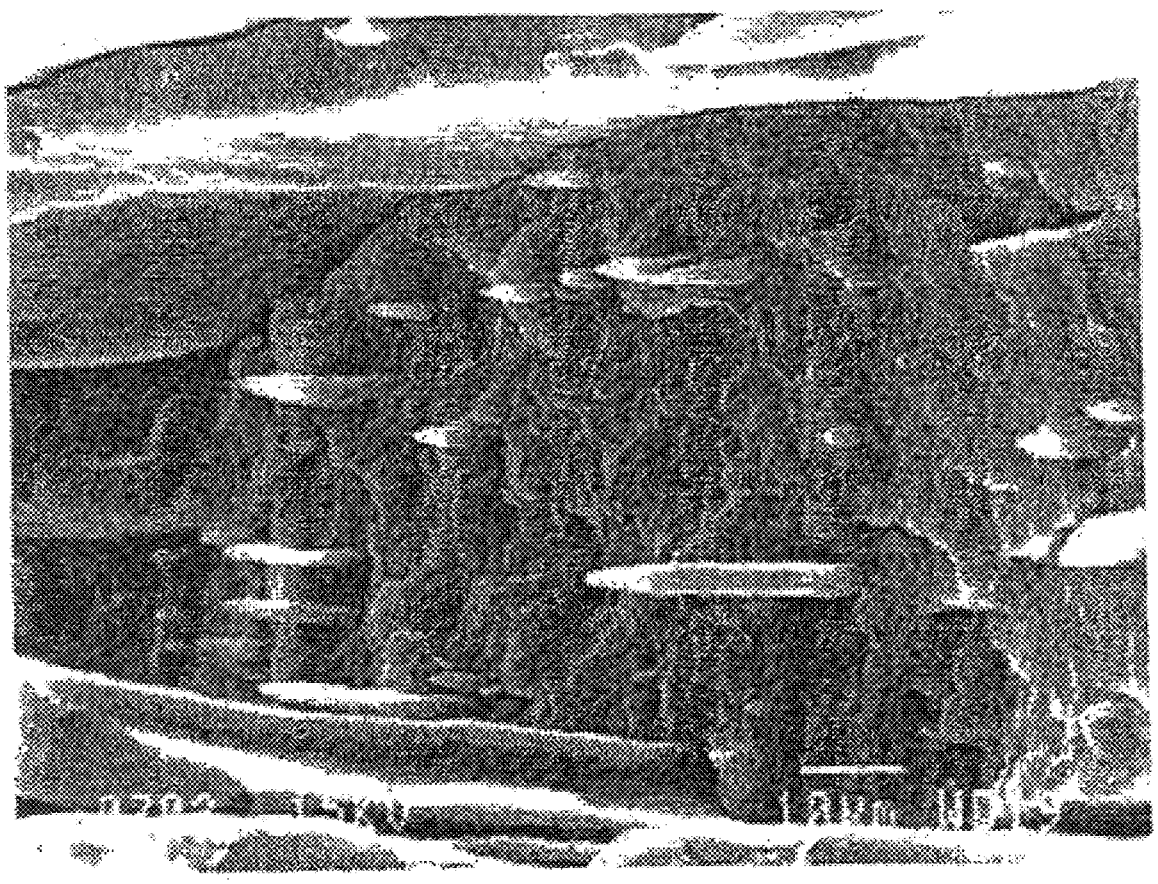
FIG. 7-*a* is a cross-section view of a stretched film of PP/EVOH(80/20) cryogenically broken along the drawing direction (Draw ratio=10).
Figure 7B:
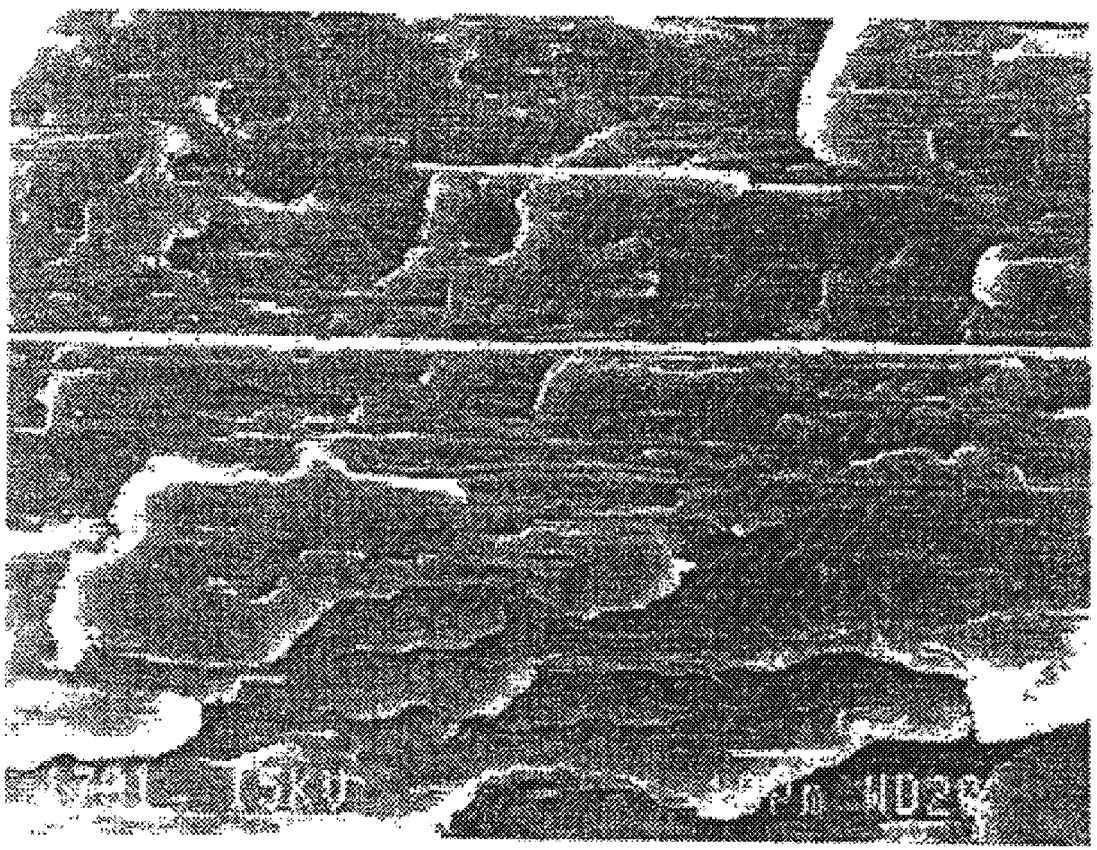
Figure 7C:
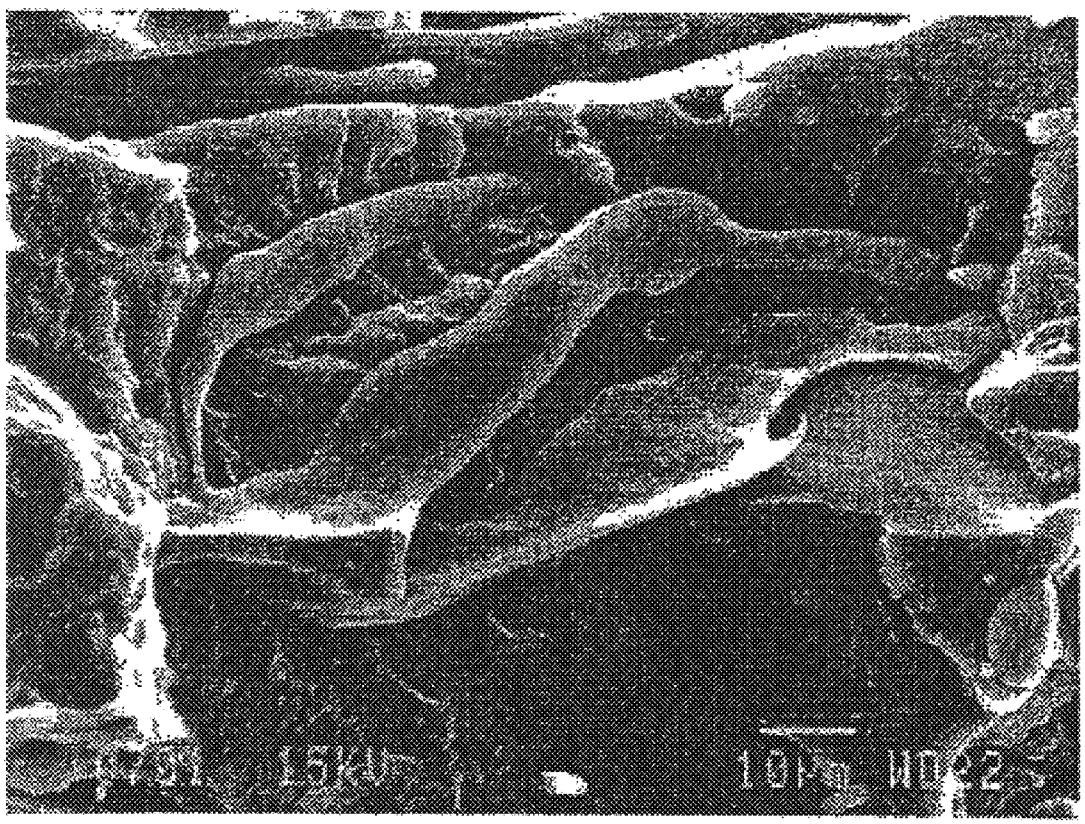
Figure 7D:
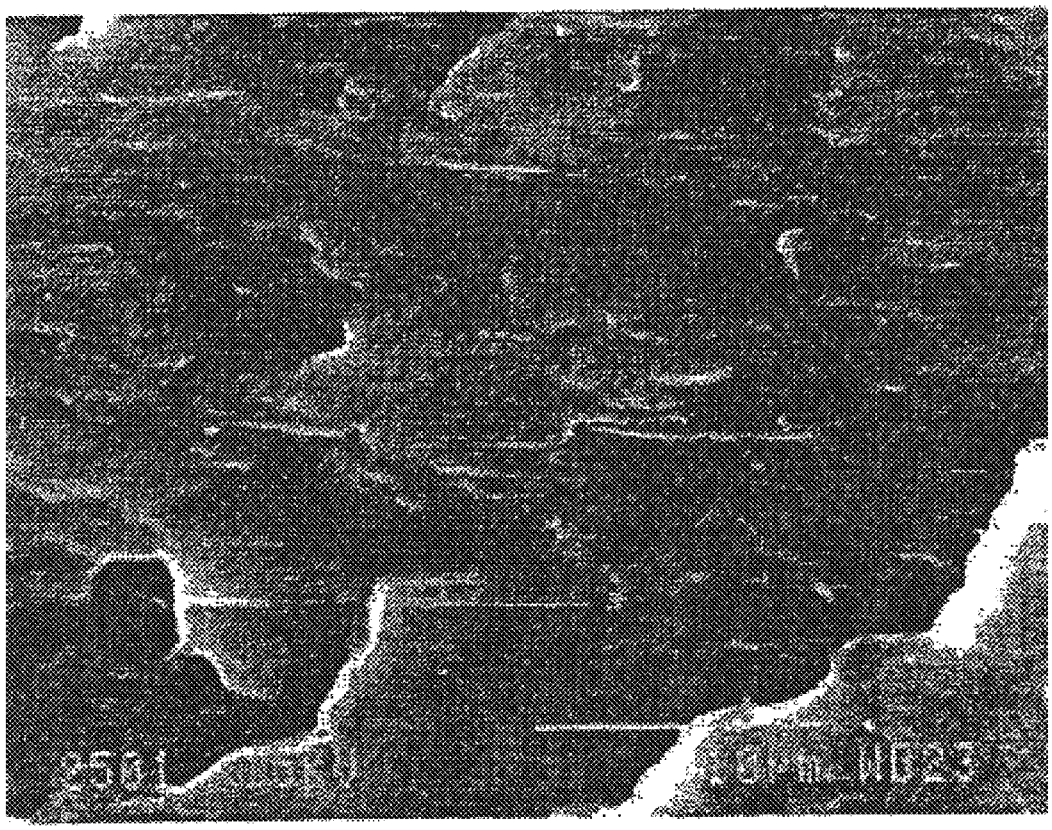
Figure 7E:
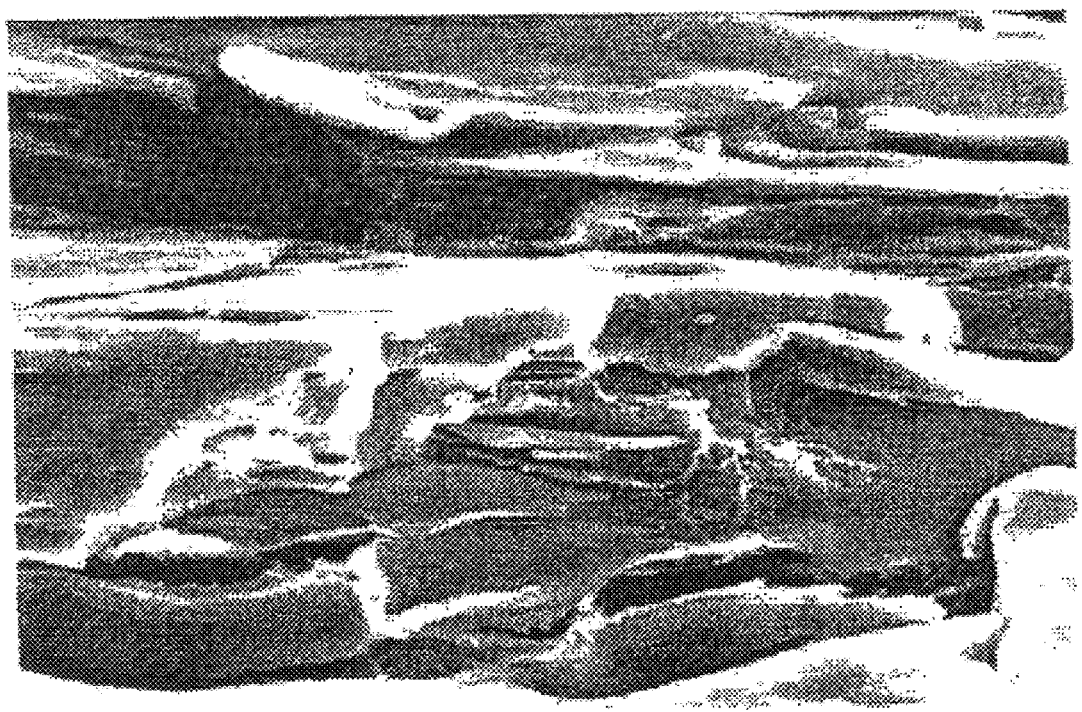

Addition of functionalized SEBS compatibilizers to the blends results in a decrease of the blends' modulus. This elasticity reduction is more pronounced for SEBS-g-MAH modified blend. As seen in FIG. 5, the glass-transition of PP is close to 0° C., which could result in brittleness of the packaging film at food preservation temperatures. A lower elasticity would make a packaging film more flexible (ductile) at low temperatures, which would make the polymer film more resistant to mechanical shocks and forces.

Differential Scanning Calorimetry (DSC)

The results of the DSC tests carried out on the starting materials and their blends are summarized in Table 3. The extent of the interaction between the compatibilizer and the EVOH phase can be estimated using DSC data. The melting point of the original PP is slightly decreased upon its functionalization or its mixing with EVOH polymer. In contrast, melting of the EVOH copolymer remains almost unchanged. A slight decrease in the melting point of the EVOH phase is observed for PP-g-MAH compatibilized blends while PP-g-DEM seems to be ineffective. As expected, anhydride functional groups are chemically more active than ester groups. Therefore, a higher rate of interaction is expected for PPS-g-MAH. The same increase is observed for functionalized SEBS copolymers. It is worth noting that the melting point of the SEBS-g-MAH modified blend has the lowest melting temperature.

TABLE 3

Melting point of different phases of the blends

| Polymer or Blend | $T_m$(° C.) PP phase | $T_m$(° C.)EVOH phase |
|---|---|---|
| Original PP | 164.53 ± 0.20 | |
| Original EVOH | | 182.02 ± 2.26 |
| PP-g-MAH | 161.68 ± 1.33 | |
| PP-g-DEM | 162.77 ± 1.14 | |
| PP/EVOH (80/20) | 162.03 ± 0.57 | 183.00 ± 0.12 |
| PP/EVOH/PP-g-MAH (81.5/16.5/2) | 162.62 ± 0.34 | 182.35 ± 0.19 |
| PP/EVOH/PP-g-DEM (81.5/16.5/2) | 162.40 ± 0.68 | 183.02 ± 0.09 |
| PP/EVOH/SEBS-g-MAH (81.5/16.5/2) | 162.35 ± 0.18 | 181.01 ± 0.04 |
| PP/EVOH/SEBS-g-DEM (81.5/16.5/2) | 161.87 ± 0.06 | 182.81 ± 0.06 |

Film Processing

After the components of a blend are mixed in the extruder and enter the extruder's die, the dispersed phase domain has a spherical shape. Leaving the die, the materials are subjected to an external force applied by the drawing machine (rolls). Film stretching occurs over a distance separating the die from rolls. The ability of an extruded film to be stretched is a very important factor in film making processes. Such a stretching orients matrix and dispersed phase. The oriented structure reduces the gas permeability of the drawn film by aligning and overlapping the barrier components of the film. Consequently, a polymer blend having a larger ability to be stretched should give a less permeable film.

To check this assumption, different blends were stretched at different speeds of the drawing machine. Such experiments showed that the maximum attainable draw ratio for the blend and polymer-g-DEM modified blends is 20. Over this value, the extruded films disintegrate under the force applied by drawing machine. However, this maximum ratio was enhanced up to 40 for polymer-MAH modified blends. This is mainly due to the smaller size of EVOH inclusion in the case of MAH modified blends, which reduces the barrier properties of the blends.

Scanning Electron Microscopy (SEM)

The microstructure of the extruded filaments and films of the blends were studied using scanning electron microscopy. The SEM micrographs of filaments drawn at a draw ratio of 20 (FIGS. 6-*a* to 6-*e*) and films drawn at a draw ratio of 10 (FIGS. 7-*a* to 7-*b*) are reported. The filaments were cryogenically broken transversely to the drawing direction whereas the films were broken along the drawing direction. Such procedure provides two different dimensions of the oriented dispersed phase.

In FIG. 6-*a* some lamellae and round cross-section of the dispersed phase (EVOH) are observable. The diameter of the fibrils ranges between 1 and 3 $\mu$m. A large number of cavities, smoothness of the interface and separated lamellae are indication of a poor interfacial adhesion. With the addition of polymer-g-DEM modifiers, no significant change in the morphology of the blend is observable (FIGS. 6-*c* and 6-*e*). Addition of polymer-g-MAH modifiers drastically changes the state of the dispersion of the EVOH phase in the PP matrix (FIGS. 6-*b* and 6-*d*). The diameter of the EVOH fibrils is reduced to less than 0.5 $\mu$m and no lamella is observed. The EVOH domain size is also finer for the SEBS-g-MAH modified blend. A very important point here is that the addition of a very strong compatibilizer such as MAH dramatically reduces the interfacial tension and thus makes the stretching of the dispersed particles difficult to achieve. Instead, it is more pertinent to select a lesser efficient compatibilizer such as DEM that ensures adhesion at the interface but does not reduce the size of particles.

In FIGS. 7-*a* to 7-*e*, the morphology of the blends along to the direction of drawing are reported. In FIG. 7-*a*, the fibrils of EVOH in PP matrix are observable (draw ratio=10). In FIGS. 7-*c* and 7-*e*, the microstructure of polymer-DEM modified blends are shown (draw ratio=10). In both cases the large domain size of the dispersed phase is easily observable, but a good interfacial adhesion seems to be absent.

Lamellar morphology reduces permeability. Addition of SEBS-g-MAH and PP-g-MAH to the blend results in intimately mixed mixtures (FIGS. 7-*b* to 7-*d*, draw ratio=10). Very small fibrils of EVOH phase are observable whereas lamellae are absent.

To have a lamellar morphology where use is made of PP-g-DEM and SEBS-g-DEM modified blends, one may simply reduce the percentage of these compatibilizers or use a compatibilizer having lower degree of functionalization.

This allows the generation of lamellar structure with good adhesion at the interface between such lamellae and the matrix, which ultimately results in higher barrier properties.

Mechanical Properties

Tensile properties of the starting components and the blends are summarized in Table 4. The original polymers (PP and EVOH) are characterized by high tensile modulus and high elongation at break. Upon functionalization, the tensile properties of the matrix (PP) are deteriorated in the case of PP-g-DEM. However, in the case of PP-g-MAH, the modulus is increased and the elongation at break is decreased.

As shown in Table 4, addition of PP-g-MAH to the blend results in higher modulus but lower elongation at break. In the case of PP-g-DEM, both the modulus and elongation at break are increased. In the case of SEBS-g-MAH, the modulus of the blend substantially decreases but the elongation at break strongly increases as compared to the original blend. In the case of SEBS-g-DEM, the modulus of the blend is of the same magnitude as that of the original blend while the elongation at break is increased by 600% as compared to that of the original blend.

These observations along with the observed barrier properties emphasize that DEM-grafted polymers are the best additives to ensure a certain adhesion while permitting to obtain lamellar structures and enhanced barrier properties.

TABLE 4

Tensile properties of the blends

| Polymer or Blend | Young modulus (Mpa) | Elongation at break (%) |
| --- | --- | --- |
| Original PP | 932.31 ± 76.09 | 504.0 ± 77.1 |
| Original EVOH | 2467.87 ± 224.97 | 309.7 ± 19.4 |
| PP-g-MAH | 1010.99 ± 99.04 | 5.96 ± 1.06 |
| PP-g-DEM | 756.95 ± 79.56 | 5.10 ± 1.36 |
| PP/EVOH (80/20) | 769.76 ± 106.97 | 20.69 ± 6.4 |
| PP/EVOH/PP-g-MAH (81.5/16.5/2) | 1174.42 ± 69.33 | 11.9 ± 2.3 |
| PP/EVOH/PP-g-DEM (81.5/16.5/2) | 943.00 ± 179.05 | 27.0 ± 9.9 |
| PP/EVOH/SEBS-g-MAH (81.5/16.5/2) | 476.62 ± 76.09 | 153.3 ± 40.7 |
| PP/EVOH/SEBS-g-DEM (81.5/16.5/2) | 754.96 ± 64.33 | 124.9 ± 5.4 |

Barrier Properties

Barrier properties of the new blends are reported in Table 5. The permeability of the extruded and batch mixed films to oxygen gas were measured under two different conditions, that is $$\frac{O_2}{N_2} \text{ relative humidity} = \frac{31\%}{\text{Dry}} \text{ and}$$

$$\frac{O_2}{N_2} \text{ relative humidity} = \frac{90\%}{90\%}$$

The effect of film stretching on barrier properties of non-compatibilized blend is also presented in Table 5.

As can be seen, upon stretching, the permeability to oxygen of PP is decreased by 75–79% under two different humidity conditions. A comparison between the barrier properties of non-stretched and stretched films made of a non-compatibilized blend, show 15–25% and 75–79% improvements, respectively. This comparison shows the effect of stretching process on microstructure and barrier properties of films.

It is also shown that compatibilization with DEM leads to materials with enhanced barrier properties. A 97% decrease in PP permeability to oxygen was obtained when the blend is compatibilized by PP-g-DEM. The decrease reached even 100% in the case of SEBS-g-DEM.

These observations confirm the beneficiary effect of tailoring the polymers in barrier polymer films. Among the two grafted polymers used as compatibilizers, SEBS-g-DEM show higher mechanical properties and the lowest permeability to oxygen.

temperature (for instance 250° C.) and is followed by a stretching. Such procedure generates the requested lamellar structure. Then, a second dispersion of the blend via extrusion or injection molding in a material having low melting temperature such as polyolefins allows the generation of polymer/polymer composite materials with enhanced mechanical and barrier properties.

This type of organic composite materials with lamellar structures can be easily processed using the conventional machinery developed for thermoplastic materials.

TABLE 5

Barrier properties of the blends

| Polymer or Blend | Draw ratio | Permeability mm · cm³/(m² · day · atm) $\frac{O_2}{N_2}$ Rh% = $\frac{31}{dry}$ Condition A | Permeability mm · cm³/(m² · day · atm) $\frac{O_2}{N_2}$ Rh% = $\frac{90}{90}$ Condition B | Changes in barrier properties $\frac{cf.PP}{cf.original\ blend}$ A | B |
|---|---|---|---|---|---|
| Original PP | B | 80.7 | 76 | | |
| Original EVOH | B | ~0.0001 | 0.023 | | |
| PP/EVOH (83.5/16.5) | B | 61.4 | 64.5 | $\frac{+24\%}{0\%}$ | $\frac{+15\%}{0\%}$ |
| | 5* | 20.6 | 16.2 | $\frac{+75\%}{+66\%}$ | $\frac{+79\%}{+75\%}$ |
| PP/EVOH/PP-g-MAH (81.5/16.5/2) | 5 | 23.8 | 29.1 | $\frac{+71\%}{-16\%}$ | $\frac{+62\%}{-81\%}$ |
| PP/EVOH/PP-g-DEM (81.5/16.5/2) | 5 | 2.7 | 5.4 | $\frac{+97\%}{+87\%}$ | $\frac{+93\%}{+67\%}$ |
| PP/EVOH/SEBS-g-MAH (81.5/16.5/2) | 5 | 32.1 | 37.2 | $\frac{+60\%}{-56\%}$ | $\frac{+51\%}{-130\%}$ |
| PP/EVOH/SEBS-g-DEM (81.5/16.5/2) | 5 | 0.07 | 3.4 | $\frac{+99.9\%}{+99,7\%}$ | $\frac{+95.5\%}{+79\%}$ |

B = Non stretched film, + = Improvement, − = Deterioration, * = Original blend

Organic Composite Materials with Lamellae Structure

Another category of materials with enhanced mechanical and barrier properties was obtained by dispersing at 30–40wt % of PP/EVOH/PP-g-MAH or PP/EVOH/SEBS-g-DEM in a low viscosity polypropylene (PPlv) at temperatures lower than the melting point of EVOH. These polymer/polymer composite materials were obtained by a second extrusion or injection molding at temperatures lower than (Tm=185° C.) where the EVOH is in the rubbery state. Morphological analysis showed that the EVOH lamellae were kept almost intact, thereby imparting the extruded film with enhanced barrier properties. In fact, the permeability of these films is of about 0.2 at 31 RH and 5.1 for 90 RH (RH relative humidity) and the mechanical properties were found, within experimental errors, almost unmodified.

This embodiment offers a useful procedure for preparing materials with a lamellar structure. The PP/EVOH/PP-g-DEM and PP/EVOH/SEBS-g-DEM can be tailored separately and then combined afterwards in the desired proportion with a compatible matrix at temperatures ensuring the preservation of lamellar structure. The strategy can be used with other barrier materials such as PA (polyamide) or PBT (polybutylene therephtalate) combined or not with EVOH. These materials offer even more flexibility for the temperature of processing since their melting temperatures are both higher than 220° C. A first extrusion is carried out at high The major differences between the previous work disclosed in the article of FAISANT et al. and the present invention are as follows.

TABLE 6

| | Prior Work | |
|---|---|---|
| Aspect | Details | Properties |
| Materials | Blends of PP-g-MAH/EVOH dispersed in PPlv PP-g-MAH/(HDPE-EVOH) | Good mechanical properties Enhanced barrier properties |
| Processing conditions | Two steps operation followed by film drawing at the exit of the die Lamellar structure obtained in solid state | Preservation of cristallinity and mechanical properties of PP Easy processing conditions Versatility to tailor desired material for specific application |

TABLE 7

Invention

| Aspect | Details | Properties | |
|---|---|---|---|
| New compatibilizers | PP-g-DEM, (1) SEBS-g-DEM, (2) SEBS-g-MAH (3) | (1)- (1)- (1)- | Lamellar morphology Enhanced barrier properties Lower elongation at break |
| Processing conditions | Film drawing using cheap equipment Lamellar structure obtained in solid state | (2)- (2)- (2)- (2)- (2)- (2)- (3)- (3)- | Lamellar morphology Enhanced barrier properties Good mechanical properties High elongation at break Enhanced rheological and thermomechanical properties Improved interfacial adhesion that insures better stress transfer between the phases Mainly fibrillar morphology Good mechanical properties but lower barrier properties |
| | Easy processing conditions Variety of compatibilizing strategies Versatility to tailor desired material for specific application | | |

CONCLUSION

The above examples clearly emphasize the influence of the compatibilizers' structures and of the processing conditions (film stretching) on properties of the extruded films of PPE/EVOH blend. In particular, stretching of the polymer films after extrusion substantially improves the barrier properties of the film as compared to those of non-stretched films.

The principal aim of compatibilization and film stretching is to obtain a morphology that shows the highest barrier property and facility of processing.

The results of the above tests show that PP-g-MAH and SEBS-g-MAH extensively reduce the size of the EVOH phase and improve interfacial adhesion. These compatibilizers also improve mechanical properties but they increase the permeability of the blends to oxygen.

The diethyl maleate (DEM) counterparts of these polymers improve mechanical properties but do not change the morphology with respect to that of unmodified PP/EVOH blends. DEM grafted polymers extensively improve barrier properties of their blends.

It is worth noting that enhanced mechanical and barrier properties can also be obtained by dispersing the first blend via a second extrusion or injection molding at temperatures lower than the melting temperature of EVOH lamellae. Unlike classical composites, the organic composite materials with a lamellar structure according to the invention can be easily processed using the conventional equipments used for thermoplastic materials.

What is claimed is:

1. A process for making a multiphase polymeric film having a lamellar structure with controlled permeability, comprising the steps of:

preparing a molten blend comprising:
a first polymer phase dispersed in a second polymer phase which is a matrix polymer phase incompatible with the said first phase, and
a compatibilizer selected from the group consisting of DEM, DEM-g-SEBS and DEM-g-PP;

extruding the molten blend through a flat die provided with an exit;

stretching the so-extruded blend downstream of said exit at a preselected stretching ratio to produce the said multiphase polymeric film; and solidifying the extruded film sufficiently rapidly to preserve the lamellar structure;

wherein a permeability of the polymeric film to oxygen gas under an $O_2/N_2$ relative humidity of 31%/dry is 2.7 mm*$cm^3$/($m^2$*day*atm) or less.

2. The process of claim 1, wherein:

the first polymer phase consists of a barrier polymer selected from the group consisting of ethylene vinyl alcohol copolymers (EVOH), polyamides (PA), polyethylene terephtalates (PET) and polydivinylchlorides (PVDC); and the matrix polymer phase comprises a thermoplastic matrix polymer phase consisting of a polyolefin selected from the group consisting of polyethylene (PE) and polypropylene (PP).

3. The process according to claim 2, wherein the barrier polymer is EVOH and the matrix polymer is PP.

4. The process according to claim 2, wherein the molten blend comprises:

60 to 90 weight percent of said polyolefin, less than 30 weight percent of said first polymer phase, and 0.2 to 10 weight percent of said compatibilizer.

5. The process according to claim 4, wherein the molten blend comprises from 1 to 3 weight percent of said compatibilizer.

6. The process according to claim 4, wherein the compatibilizer is selected from the group consisting of DEM-g-SEBS and DEM-g-PP.

7. The process according to claim 6, wherein the permeability of the polymeric film to oxygen gas under an $O_2/N_2$ relative humidity of 31%/dry is 2.7 mm*$cm^3$/($m^2$*day*atm) to 0.0.7 mm*$cm^3$/($m^2$*day*atm).

8. The process according to claim 2, further comprising grinding the multiphase polymeric film to form first granules.

9. The process according to claim 8, further comprising preparing a shaped article of polymeric material by direct injection or extrusion of a blend of the first granules, with at least one of a second polyolefin and a material compatible with the polyolefin selected from the group consisting of PE and PP.

10. The process according to claim 8, further comprising reprocessing the first granules by injection moulding, thermoforming or extrusion.

11. A process for making a multiphase polymeric film having a lamellar structure with controlled permeability, comprising the steps of:

preparing a molten blend comprising:
a first polymer phase dispersed in a second polymer phase which is a matrix polymer phase incompatible with the said first phase, and
a compatibilizer selected from the group consisting of DEM, DEM-g-SEBS and DEM-g-PP;

extruding the molten blend through a flat die provided with an exit;

stretching the so-extruded blend downstream of said exit at a preselected stretching ratio to produce the said multiphase polymeric film; and solidifying the extruded film sufficiently rapidly to preserve the lamellar structure;

wherein a permeability of the polymeric film to oxygen gas under an $O_2/N_2$ relative humidity of 90%/90% is 5.4 mm*cm$^3$/(m$^2$*day*atm) or less.

12. The process of claim 11, wherein:

the first polymer phase consists of a barrier polymer selected from the group consisting of ethylene vinyl alcohol copolymers (EVOH), polyamides (PA), polyethylene terephtalates (PET) and polydivinylchlorides (PVDC); and the matrix polymer phase comprises a thermoplastic matrix polymer phase consisting of a polyolefin selected from the group consisting of polyethylene (PE) and polypropylene (PP).

13. The process according to claim 12, wherein the barrier polymer is EVOH and the matrix polymer is PP.

14. The process according to claim 12, wherein the molten blend comprises:

60 to 90 weight percent of said polyolefin, less than 30 weight percent of said first polymer phase, and 0.2 to 10 weight percent of said compatibilizer.

15. The process according to claim 14, wherein the molten blend comprises from 1 to 3 weight percent of said compatibilizer.

16. The process according to claim 14, wherein:

the compatibilizer is selected from the group consisting of DEM-g-SEBS and DEM-g-PP; and the permeability of the polymeric film to oxygen gas under an $O_2/N_2$ relative humidity of 90%/90% is 5.4 mm*cm$^3$/(m$^2$*day*atm) to 3.4 mm*cm$^3$/(m$^2$*day*atm).

17. A process for making a multiphase polymeric film having a lamellar structure with controlled permeability, comprising the steps of:

preparing a molten blend comprising:

a first polymer phase dispersed in a second polymer phase which is a matrix polymer phase incompatible with the said first phase, and a compatibilizer selected from the group consisting of DEM, DEM-g-SEBS and DEM-g-PP;

extruding the molten blend through a flat die provided with an exit;

stretching the so-extruded blend downstream of said exit at a preselected stretching ratio to produce the said multiphase polymeric film; and solidifying the extruded film sufficiently rapidly to preserve the lamellar structure;

wherein a barrier property of the polymeric film to oxygen gas under an $O_2/N_2$ relative humidity of 31%/dry is least 87% better than a barrier property to oxygen gas of a polymeric film comprising the blend of the first polymer phase and the second polymer phase without the compatibilizer under the same conditions.

18. The process of claim 17, wherein:

the first polymer phase consists of a barrier polymer selected from the group consisting of ethylene vinyl alcohol copolymers (EVOH), polyamides (PA), polyethylene terephtalates (PET) and polydivinylchlorides (PVDC); and the matrix polymer phase comprises a thermoplastic matrix polymer phase consisting of a polyolefin selected from the group consisting of polyethylene (PE) and polypropylene (PP).

19. The process according to claim 18, wherein the barrier polymer is EVOH and the matrix polymer is PP.

20. The process according to claim 18, wherein the molten blend comprises:

60 to 90 weight percent of said polyolefin, less than 30 weight percent of said first polymer phase, and 0.2 to 10 weight percent of said compatibilizer.

21. The process according to claim 20, wherein the molten blend comprises from 1 to 3 weight percent of said compatibilizer.

22. The process according to claim 18, wherein:

the compatibilizer is selected from the group consisting of DEM-g-SEBS and DEM-g-PP; and the barrier property of the polymeric film to oxygen gas under an $O_2/N_2$ relative humidity of 31%/dry is 87% to 99.7% better than a barrier property of a polymeric film comprising the blend of the first polymer phase and the second polymer phase without the compatibilizer.

23. A process for making a multiphase polymeric film having a lamellar structure with controlled permeability, comprising the steps of:

preparing a molten blend comprising:

a first polymer phase dispersed in a second polymer phase which is a matrix polymer phase incompatible with the said first phase, and a compatibilizer selected from the group consisting of DEM, DEM-g-SEBS and DEM-g-PP;

extruding the molten blend through a flat die provided with an exit;

stretching the so-extruded blend downstream of said exit at a preselected stretching ratio to produce the said multiphase polymeric film; and solidifying the extruded film sufficiently rapidly to preserve the lamellar structure;

wherein a barrier property of the polymeric film to oxygen gas under an $O_2/N_2$ relative humidity of 31%/dry is least 97% better than a barrier property to oxygen gas of a polymeric film consisting of the first polymer phase under the same conditions.

24. The process of claim 23, wherein:

the first polymer phase consists of a barrier polymer selected from the group consisting of ethylene vinyl alcohol copolymers (EVOH), polyamides (PA), polyethylene terephtalates (PET) and polydivinylchlorides (PVDC); and the matrix polymer phase comprises a thermoplastic matrix polymer phase consisting of a polyolefin selected from the group consisting of polyethylene (PE) and polypropylene (PP).

25. The process according to claim 24, wherein the barrier polymer is EVOH and the matrix polymer is PP.

26. The process according to claim 24, wherein the molten blend comprises:

60 to 90 weight percent of said polyolefin, less than 30 weight percent of said first polymer phase, and 0.2 to 10 weight percent of said compatibilizer.

27. The process according to claim 26, wherein the molten blend comprises from 1 to 3 weight percent of said compatibilizer.

28. The process according to claim 24, wherein:

the compatibilizer is selected from the group consisting of DEM-g-SEBS and DEM-g-PP; and the barrier property of the polymeric film to oxygen gas under an $O_2/N_2$ relative humidity of 31%/dry is 97% to 99.9% better than a barrier property of a polymeric film consisting of the first polymer phase.

29. A process for making a multiphase polymeric film having a lamellar structure with controlled permeability, comprising the steps of:

preparing a molten blend comprising:
a first polymer phase dispersed in a second polymer phase which is a matrix polymer phase incompatible with the said first phase, and
a compatibilizer selected from the group consisting of DEM, DEM-g-SEBS and DEM-g-PP;

extruding the molten blend through a flat die provided with an exit;

stretching the so-extruded blend downstream of said exit at a preselected stretching ratio to produce the said multiphase polymeric film; and solidifying the extruded film sufficiently rapidly to preserve the lamellar structure;

wherein a barrier property of the polymeric film to oxygen gas under an $O_2/N_2$ relative humidity of 90%/90% is least 93% better than a barrier property to oxygen gas of a polymeric film consisting of the first polymer phase under the same conditions.

30. The process of claim 29, wherein:

the first polymer phase consists of a barrier polymer selected from the group consisting of ethylene vinyl alcohol copolymers (EVOH), polyamides (PA), polyethylene terephtalates (PET) and polydivinylchlorides (PVDC); and the matrix polymer phase comprises a thermoplastic matrix polymer phase consisting of a polyolefin selected from the group consisting of polyethylene (PE) and polypropylene (PP).

31. The process according to claim 30, wherein the barrier polymer is EVOH and the matrix polymer is PP.

32. The process according to claim 31, wherein the molten blend comprises:

60 to 90 weight percent of said polyolefin, less than 30 weight percent of said first polymer phase, and 0.2 to 10 weight percent of said compatibilizer.

33. The process according to claim 32, wherein the molten blend comprises from 1 to 3 weight percent of said compatibilizer.

34. The process according to claim 29, wherein:

the compatibilizer is selected from the group consisting of DEM-g-SEBS and DEM-g-PP; and the barrier property of the polymeric film to oxygen gas under an $O_2/N_2$ relative humidity of 90%/90% is 93% to 95.5% better than a barrier property of a polymeric film consisting of the first polymer phase.

35. A process for making a multiphase PP/EVOH/compatibilizer polymeric film having a lamellar structure with controlled permeability, comprising the steps of:

preparing a molten blend comprising:
EVOH dispersed in PP; and
a compatibilizer selected from the group consisting of DEM-g-SEBS and DEM-g-PP;

extruding the molten blend through a flat die provided with an exit;

stretching the so-extruded blend downstream of said exit at a preselected stretching ratio to produce the said multiphase polymeric film; and solidifying the extruded film sufficiently rapidly to preserve the lamellar structure;

wherein a barrier property of the PP/EVOH/compatibilizer polymeric film to oxygen gas under an $O_2/N_2$ relative humidity of 31%/dry is least 88% better than a barrier property to oxygen gas of a PP/EVOH/PP-g-MAH polymeric film under the same conditions.

36. The process according to claim 35, wherein the molten blend comprises:

60 to 90 weight percent of said PP, less than 30 weight percent of EVOH, and 1 to 3 weight percent of said compatibilizer.

37. The process according to claim 36, wherein the compatibilizer is DEM-g-SEBS.

38. The process according to claim 36, wherein the compatibilizer is DEM-g-PP.

* * * * *